Patented Apr. 27, 1937

2,078,570

UNITED STATES PATENT OFFICE 2,078,570

WOOD PRESERVATIVE OIL

August Holmes, Elizabeth, N. J., assignor to Standard Oil Development Company, a corporation of Delaware No Drawing. Application June 6, 1933, Serial No. 674,521

7 Claims. (Cl. 21—45)

This invention relates to a wood preservative oil and to methods for preparing same and more specifically to the separation of such an oil from a petroleum oil acid sludge.

It has been found that oils substantially free of pitchy and asphaltic matter may be separated from the acid sludges obtained on treating petroleum oils with strong or fuming sulfuric acid. It has also been found that these separated oils, which may be conveniently called "sludge oils" for the purpose of this invention, are useful for the preservation of wood and similar porous materials. The sludge oils possess valuable fungicidal characteristics and may be used alone for the treating and impregnation of wood. They may also be mixed with other fungicides and with hydrocarbon oils generally which may or may not possess fungicidal value. A specially valuable characteristic of the sludge oils is their substantially complete miscibility with other wood preservative oils, such as creosote, which are obtained in the destructive distillation of carbonaceous materials such as wood and coal. It has already been proposed to use ordinary distillate or residuum oils from petroleum as a diluent in admixture with creosote as a fungicide, but it has been observed that such petroleum oils do not dissolve certain resinous and pitchy substances present in the creosote. These substances ordinarily remain as a suspension in the mixture and represent a serious objection in the use of such mixtures in the impregnation of wood, as they tend to deposit in the pores and passages of the wood and to hinder the penetration of the wood by the active fungicidal oils and to settle out in the impregnating and storage vessels. The sludge oils cause substantially no such precipitation on admixture with creosote and are also more desirable for their use than ordinary petroleum diluents because of their own fungicidal characteristics.

The acid sludges preferred for the preparation of the sludge oils are those obtained by treating petroleum fractions with strong or fuming sulfuric acid for the preparation of white products, such as burning oils, naphthas, and the like. The following examples illustrate a suitable method for obtaining the sludge oil and its miscibility with coal tar distillates.

Example 1

A petroleum burning oil stock is treated with an excess of concentrated sulfuric acid to produce a finished burning oil. The resulting sludge is washed with water to reduce its free acid content to about 22% or less. The washed sludge, or "acid tar", is then heated to a still temperature of about 300° F. at 50 lbs. per sq. in. pressure. Steam is blown through the sludge throughout this operation. There is obtained as a distillate an oil of the following characteristics:

Gravity °A. P. I. _____ 33.3
Sulfur per cent by weight_____ 9.1
Engler distillation
  Initial boiling point °F_____ 170
  10% off at—°F_____ 275
  50% off at—°F_____ 352
  90% off at—°F_____ 404
  Final boiling point °F. (97.75% off)_____ 538

Example 2

A blend of a distillate sludge oil obtained in Example 1, with 25% of Barrett's Carbosota, a coal tar creosote, showed practically no separation of solid matter.

Example 3

An acid sludge obtained in treating a petroleum naphtha stock is washed and heated in the same manner as described in Example 1. The resulting distillate oil has the following characteristics:

Gravity °A. P. I. _____ 31.6
Sulfur per cent by weight_____ 7.1
Engler distillation
  Initial boiling point °F_____ 176
  10% off at—°F_____ 326
  50% off at—°F_____ 400
  90% off at—°F_____ 542
  Final boiling point (98.5% off) °F_____ 642

Example 4

A blend of the distillate sludge oil from Example 3 with 25% of Barrett's Carbosota showed a very slight separation of insoluble material which was slightly greater in amount than the blend obtained in Example 2.

Example 5

An ordinary petroleum distillate oil of similar boiling range to the sludge oils described above was blended with 25% Barrett's Carbosota. The resulting blend showed a heavy precipitation of a sticky resinous pitchy material.

The distillation residues from the treatment of acid sludges described in Examples 1 and 3 possess desirable asphaltic qualities and may be used as obtained or after oxidation as briquetting asphalts, battery box compounds and the like depending upon the extent of the distillation and the hardness and other characteristics of the residues.

The sludge oils obtained from acid tars from petroleum white products treating are generally higher in sulfur content than those obtained from acid treating of other petroleum oils. It is desirable for wood impregnating purposes and for miscibility with creosote to use oils containing a relatively high content of sulfur say above 5% and oils containing 10 to 15% or even more of sulfur may be used for this purpose.

The use of pressure in the distillations of acid sludge described in the above examples is primarily to counteract the foaming tendency of the sludge. The distillations may be conducted at higher or lower pressures for example at atmospheric or subatmospheric pressure, if desired, although at the latter pressures it may be necessary to take suitable precautions against foaming and excessive entrainment. When it is desired to use the residue as an asphalt it is often advantageous to add a petroleum fraction high in asphaltic constituents such as a cracking coil tar to the acid sludge before the distillation.

The sludge oils may be used for preserving wood and similar porous materials by the methods ordinarily used for wood treating. Wood may be impregnated, preferably with application of pressure, with a sludge oil or a mixture of sludge oil and other wood preservative oils such as shown in Examples 2 and 4.

This invention is not to be limited to any theory regarding the composition nor effectiveness of the sludge oils described herein nor to any specific examples which have been presented solely for purposes of illustration but only by the following claims in which I wish to claim all novelty insofar as the prior art permits.

I claim:

1. Process for preserving wood comprising impregnating wood with a solution of creosote in a petroleum oil acid sludge distillate oil.

2. Wood preservative composition comprising a solution containing substantial amounts of creosote in a petroleum oil acid sludge distillate oil.

3. Process for preserving wood comprising impregnating wood with a solution of creosote in a petroleum oil acid sludge distillate oil containing more than about 5% of sulfur.

4. Composition according to claim 2 in which said creosote is a coal tar creosote.

5. Process according to claim 1 in which said creosote is a coal tar creosote.

6. A wood preservative composition comprising a solution containing substantial amounts of creosote in a sludge oil containing more than about 5% of sulfur and separated from the acid, asphaltic and pitchy matter of a petroleum oil acid sludge.

7. Process for preserving wood comprising impregnating wood with the composition recited in claim 6.

AUGUST HOLMES.